Nov. 14, 1972  H. JOELE  3,702,663
HOPPER FEED DEVICE
Filed July 6, 1971  2 Sheets-Sheet 2

3,702,663
HOPPER FEED DEVICE
Hector Joele, Vlaardingen, Netherlands, assignor to Cincinnati Milacron Inc., Cincinnati, Ohio
Filed July 6, 1971, Ser. No. 159,679
Claims priority, application Netherlands, July 16, 1970, 7010553
Int. Cl. B23q 7/12; B65h 9/00
U.S. Cl. 221—167      5 Claims

ABSTRACT OF THE DISCLOSURE

A centrifugal hopper feed mechanism having a drum formed in two sections, namely an upper stationary section and a lower rotary section, and a rotary disc in the bottom of the hopper which turns in the same direction as the lower rotary section whereby the tangential frictional force on the article produced by the lower section will augment the thrust force supplied thereto by the rotary disc and hence enable the rate at which articles are delivered from the hopper to be increased.

BACKGROUND OF THE INVENTION

In the past, centrifugal hopper feed devices have consisted mainly of an upstanding, cylindrical drum open at both ends, a circular rotary disc located in the bottom of the drum, and a tangential outlet opening disposed in the drum wall at a level corresponding to the top face of the rotary disc. When such a centrifugal hopper is placed in operation by loading it with the articles to be fed and driving the rotary disc from a source of power, the articles will be driven around the drum by reason of their frictional contact with the face of the disc. As a result, the articles are subjected to a centrifugal force tending to press them outwardly against the wall of the drum. This causes the outermost articles to exit through an outlet opening in the wall of the drum and into a feed chute through which they are transported to a grinding machine or other utilizing device.

It will be realized that those articles which are simultaneously in contact with the rotary disc and the wall of the drum, i.e., the outermost articles on the disc, are exposed to a braking tangential frictional force caused by the pressure of the articles against the stationary drum wall. Because of this countervailing force imposed upon the articles, the feed rate thereof from the hopper cannot be increased indefinitely by merely increasing the speed of the rotary disc since a point is reached where the braking force balances out the thrust force from the disc and prevents any further increase in the rate at which the articles are delivered from the hopper. It has been found that the maximum feed rate of cylindrical metal articles such as needles for needle bearings is about 130 feet per minute. Since modern centerless grinders operating in the through-feed mode can operate well above this feed rate, it is desirable to increase the output of the hopper feed device to a point where it equals or exceeds the capacity of the grinding machine.

SUMMARY OF THE INVENTION

The present invention has for its purpose, the provision of a centrifugal hopper feed mechanism which will afford significantly higher delivery rates than the prior art devices. In order to accomplish this result the improved mechanism includes a feed hopper, the drum wall of which consists of two parts, an upper stationary section, and a lower rotary section which can be revolved in the same direction as the rotary disc forming the bottom of the hopper. The lower, rotary section of the drum is aligned with the upper, stationary section thereof while the rotary disc is disposed with its central axis inclined to the drum axis. Thereby, at least one point on the circumferential edge of the disc is at the level of the outlet opening formed in the sidewall of the stationary section of the drum while the opposite side of the disc is below the upper edge of the rotary section of the drum. As a result, the articles on the periphery of the disc will be assisted in their rotation by the moving wall of the drum. Hence, the braking effect of the drum wall on the articles carried by the disc is avoided and an increase in the feed rate of articles can be attained. It has been found that delivery rates of up to 425 ft. per minute are possible with the new type of hopper feed device due to the much greater thrust available for propelling the articles through the outlet opening and into the guide chute leading to the machine.

A further advantage of the new design is that, due to the greater thrust force produced on the outermost circle of articles carried by the disc, obliquely positioned articles are pressed out of the circle and the resulting opening in the series of articles will be filled up at once with properly oriented articles. Hence, a closed series of articles is delivered from the hopper and this is important since it avoids "idling" of the grinding machine with its attendant drawbacks such as deviations in size, etc.

DESCRIPTION OF THE PREFERRED EMBODIMENT

Figure 1:
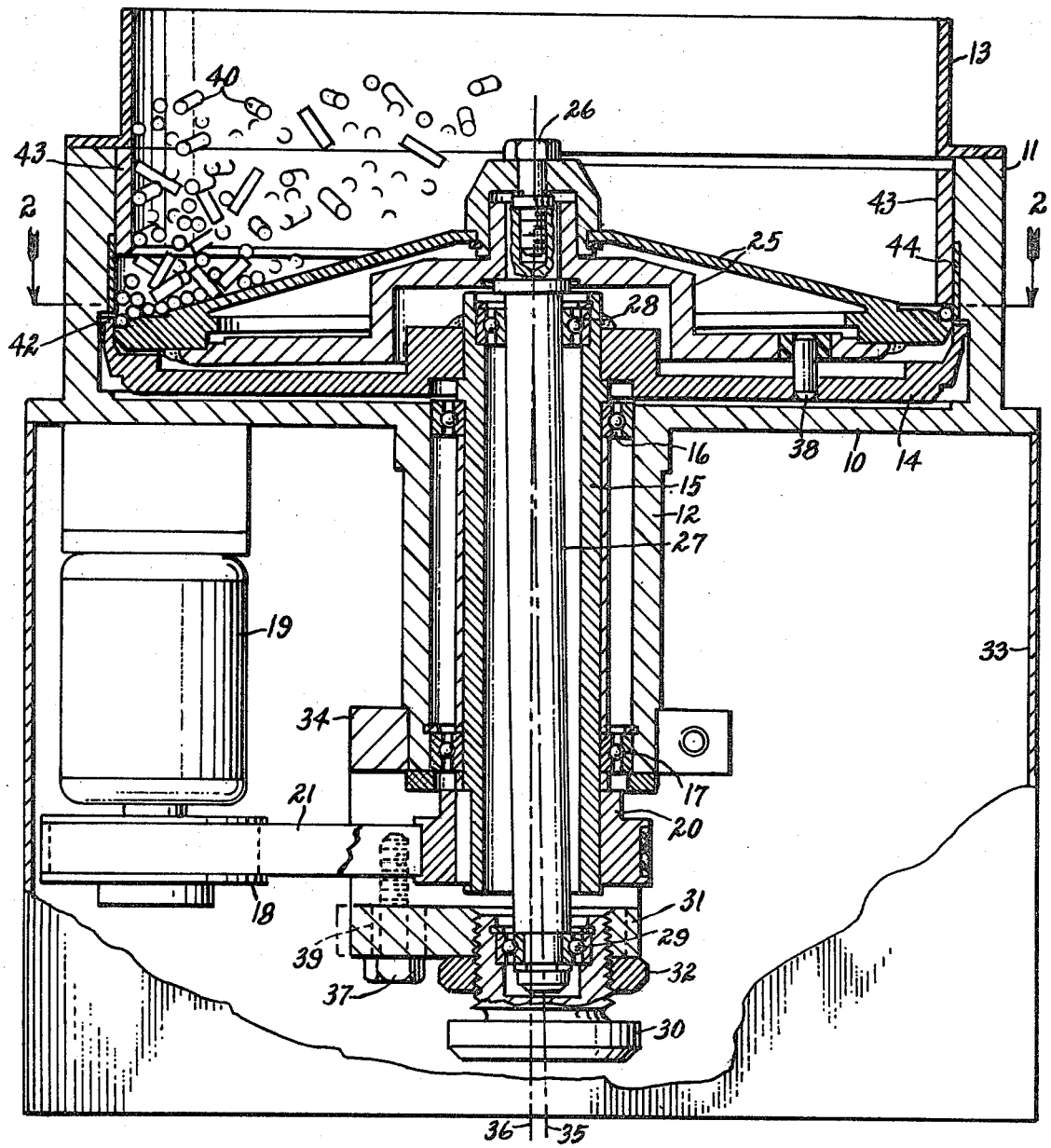
FIG. 1 is a cross-sectional view of the centrifugal hopper feed mechanism taken along the line 1—1 in FIG. 2.

As shown in FIG. 1, the hopper feed device includes a supporting frame 10 provided with an upstanding cylindrical portion 11 and a depending tubular portion 12. The portion 11 is surmounted by a cylindrical casing 13 which, together with the portion 11, comprises the upper, stationary section of the drum. The lower, rotary section of the drum is comprised of a cup-shaped ring 14 mounted on and secured to the upper end of a sleeve 15 which is journaled within the tubular portion 12 by means of antifriction bearings 16 and 17. The sleeve 15 is adapted to be driven by a motor 19 which is operatively connected to the sleeve by pulleys 18 and 20 and a belt 21.

Surmounting the ring 14 and serving as a bottom for the hopper is a disc 25 which is fastened by a bolt 26 to the upper end of a shaft 27 which is journaled for rotation within the sleeve 15 by antifriction bearings 28 and 29. The bearing 29 lies below the lower end of sleeve 15 and is supported in a screw plug 30 threaded into a tapped hole provided in a plate 31. The plate 31 is adjustably secured to the bottom of a bracket 34 by means of bolts 37 (only one shown) passing through elongated holes in the plate and threading into tapped holes provided therefor in the bracket. The bracket is arranged to be clamped onto the lower end of the sleeve portion 12 of the frame and provided with an opening to accommodate the belt 21. A lock nut 32 on the screw plug 30 enables it to be locked in place after it has been manually rotated to determine the vertical position of the disc 25. It is to be noted that the bearings 28 and 29 are of the self-aligning type and that the shaft 27 is slidable within the inner bearing race of bearing 28 to permit vertical adjustment of the shaft and disc. Also, the motor drive and the sidewise and vertical adjustment means for the shaft 27 are enclosed in a housing 33 suitably attached at its upper end to the frame 10.

As shown in FIG. 1, the central axis 35 of the shaft 27 and disc 25 is inclined with respect to the central axis 36 of the sleeve 15 and the ring 14. Such inclination of the shaft is achieved by loosening the bolts 37 and shifting the plate 31 sidewise from the neutral or zero tilt position, indicated by dot-dash lines in FIG. 1, until the desired degree of tilt of the disc is obtained. Thereby, the right-hand side of the disc, as viewed in FIG. 1, will be higher than the left-hand side thereof in order to accomplish the stated purpose of the present invention.

In the present embodiment of the invention, the disc 25 is arranged to be driven at the same speed and in the same direction as the ring 14 by means of a drive pin 38 secured to and projecting upwardly from the ring. At its upper end, the pin is received in an aperature provided in the disc 25, sufficient clearance being provided to permit the ring to move up and down on the pin as the parts rotate.

The upper surface of the disc 25 has a generally conical configuration so that the articles 40 contained in the hopper will be assisted in their movement toward the periphery of the disc as the latter rotates. At its periphery, the disc is provided with an upwardly facing groove 41 (FIG. 3) which serves as a bearing area to support the ring of articles extending around the periphery of the disc. As shown in FIG. 1, the bottom of the groove 41 lies below the upper edge 42 of the ring 14 at the low side of the disc and slightly above edge 42 at the high side of the disc.

Figure 2:
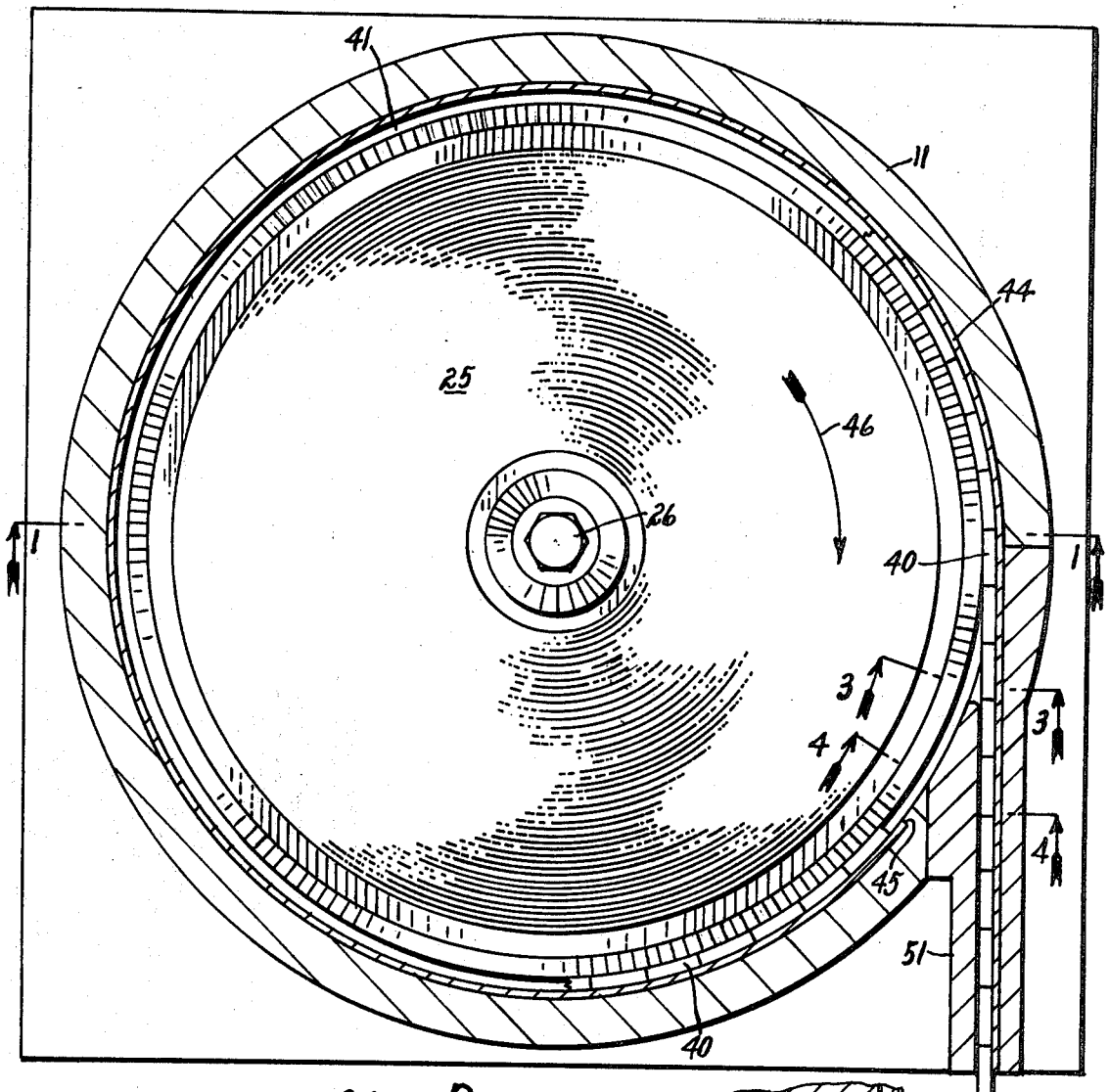
FIG. 2 is a cross-sectional view taken along the line 2—2 in FIG. 1.

Extending around the interior of the cylindrical portion 11 of the frame and above the groove 41 is a ring 43 which, on the low side of the disc 25, is spaced sufficiently far above the groove as to permit free access thereto by the articles 40. However, on the high side of the disc, the lower edge of the ring 43 lies sufficiently close to the top of an article disposed in the groove as to prevent more than one article at a time from exiting through an outlet opening 50 (FIG. 3) provided in a block 51 inserted in a cut-out formed in the portion 11 as shown in FIG. 2.

Figure 3:
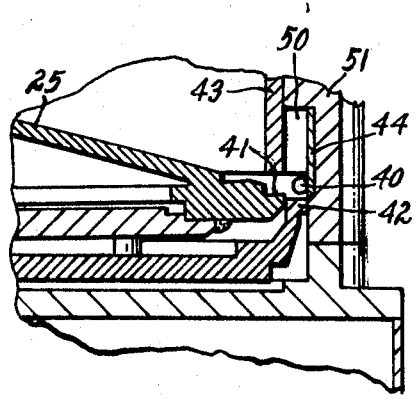
FIG. 3 is a cross-sectional view taken along the line 3—3 in FIG. 2.
Figure 4:
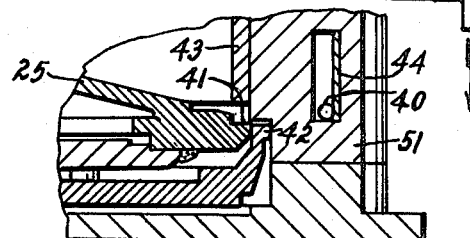
FIG. 4 is a cross-sectional view taken along the line 4—4 in FIG. 2.

Also extending around the inner periphery of the portion 11 is a wear band 44 which starts at a point 45 (FIG. 2) and continues around the portion 11 to the outlet opening 50 (FIG. 3). The band continues out through the outlet opening so as to guide the articles therethrough and into a chute through which they pass to the machine or other utilizing device.

From the foregoing, it will be apparent that in the improved centrifugal hopper feed mechanism hereinbefore described, the articles supported on the disc at its outer periphery will be driven both by the disc and also by the lower drum section until they are elevated by the raised side of the disc to the outlet opening where they will be forcibly ejected out of the hopper and into the delivery chute. It will also be apparent that the thrust on the articles can be varied within limits by raising or lowering the disc by means of the screw plug 30 so as to vary the length of the arc through which the articles bear against the ring 14 rather than the stationary band 44 situated within the drum. Also, various angles of tilt of the disc relative to the drum axis may be effected by adjustment of plate 31 to adapt the feed mechanism to articles of different diameters.

While the apparatus herein shown and described constitutes a preferred embodiment of the invention, it is to be understood that the invention is not limited to this particular form of apparatus and that changes may be made therein without departing from the scope of the invention.

What is claimed is:

1. A centrifugal hopper feed mechanism comprising an upstanding cylindrical drum having a stationary upper section and a rotary lower section, said lower section being disposed in alignment with said upper section and supported for rotation about its central axis, a circular disc supported for rotation within said drum and serving as a bottom therefor, said disc having its central axis inclinable to the central axis of said rotary drum section whereby one side of said disc lies adjacent the upper edge of said rotary drum section and the opposite side of said disc lies below the upper edge thereof, means for driving the rotary section of said drum and said disc in the same direction about their respective axes, means in said stationary drum section defining an outlet opening facing in the direction of rotation of said disc, said opening being positioned in the vicinity of the highest point on the periphery of said disc, whereby articles in the drum will exit serially and in end to end contact with one another from the outlet opening.

2. A feed mechanism according to claim 1 wherein means is provided for adjusting the angle of inclination of the central axis of said disc relative to the axis of said rotary drum section whereby the amount of tilt of said disc relative to the upper edge of said rotary drum section may be varied from 0 to a maximum.

3. A feed mechanism according to claim 1 including a bearing area for supporting articles on the periphery of said disc, and means for selectively adjusting the height of said disc and said bearing area relative to the upper edge of said rotary drum section.

4. The hopper feed mechanism of claim 1 wherein said driving means includes a motor, a driving connection from said motor to said rotary drum section, and a drive pin interconnecting said last-named section with said disc to cause said disc to rotate in unison with said rotary drum section.

5. The hopper feed mechanism of claim 1 including a frame, a sleeve secured at its upper end to said rotary drum section and supporting said drum section for rotation about its central axis on said frame, a shaft secured at its upper end to said disc and passing through said sleeve, means supporting said shaft for rotational and axial movements within said sleeve including a bearing in the upper end of said sleeve supporting the upper end of said shaft for rotation and axial sliding movement, and a bearing on the lower end of said shaft supported on said frame for both radial and axial adjustments thereon whereby either the tilt or the height of said disc may be varied as desired.

References Cited
UNITED STATES PATENTS

| | | | |
|---|---|---|---|
| 2,354,717 | 8/1944 | Treciokas | 221—169 |
| 2,959,324 | 11/1960 | Hendrickson et al. | 221—241 |
| 3,021,980 | 2/1962 | Gladfelter et al. | 221—167 |
| 3,277,998 | 10/1966 | Medoff | 221—168 |
| 3,568,882 | 3/1971 | Aidlin | 221—167 |

LLOYD L. KING, Primary Examiner

U.S. Cl. X.R.

221—241